(12) United States Patent
Maekawa et al.

(10) Patent No.: US 11,958,408 B2
(45) Date of Patent: Apr. 16, 2024

(54) VEHICLE LIGHT-ADJUSTING SYSTEM

(71) Applicant: TOYOTA BOSHOKU KABUSHIKI KAISHA, Aichi (JP)

(72) Inventors: Motoki Maekawa, Aichi (JP); Mitsutaka Sako, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 18/122,395

(22) Filed: Mar. 16, 2023

(65) Prior Publication Data

US 2023/0219496 A1  Jul. 13, 2023

Related U.S. Application Data

(63) Continuation of application No. 16/881,464, filed on May 22, 2020, now Pat. No. 11,679,716.

(30) Foreign Application Priority Data

May 29, 2019  (JP) .................................. 2019-099877

(51) Int. Cl.
*H05B 47/105*   (2020.01)
*B60Q 3/60*     (2017.01)
(Continued)

(52) U.S. Cl.
CPC .................. *B60Q 3/80* (2017.02); *B60Q 3/60* (2017.02); *H05B 47/105* (2020.01);
(Continued)

(58) Field of Classification Search
CPC ...... G02B 26/023; G02B 1/002; G02B 1/001; G02B 5/284; G02F 1/169; G02F 1/1685;
(Continued)

(56) References Cited

U.S. PATENT DOCUMENTS 7,791,785 B2 *  9/2010  Knafou ............. B32B 17/10036
                                                 359/275
8,140,219 B2 *  3/2012  Cernasov ............... G02C 7/101
                                                 359/601
(Continued)

FOREIGN PATENT DOCUMENTS

JP   2018-122675 A   8/2018
JP   2018-177193 A   11/2018
(Continued)

OTHER PUBLICATIONS

Japanese Office Action in counterpart Japanese Application No. 2019-099877, dated Oct. 4, 2022, along with English.

*Primary Examiner* — Henry Luong
(74) *Attorney, Agent, or Firm* — Greenblum & Bernstein, P.L.C.

(57) ABSTRACT

A vehicle light-adjusting system capable of adjusting the brightness in a vehicle interior day and night and appropriately performing light-adjustment for each of occupants. The vehicle light-adjusting system includes an incident portion which external light enters, a light-adjusting member arranged in the incident portion, a light emitting unit provided in an interior of the vehicle, and a control unit. The control unit controls transmittance of the light-adjusting member and controls illuminance of the light emitting unit. The light-adjusting member is divided into a plurality of parts. The control unit is capable of adjusting an individual transmittance of each of the parts.

14 Claims, 8 Drawing Sheets

(51) Int. Cl.
  *B60Q 3/74* (2017.01)
  *B60Q 3/80* (2017.01)
  *H05B 47/115* (2020.01)
  *B60Q 3/76* (2017.01)
  *G02F 1/1334* (2006.01)
  *G02F 1/137* (2006.01)
  *G02F 1/163* (2006.01)
  *G02F 1/1685* (2019.01)

(52) U.S. Cl.
  CPC ............. *H05B 47/115* (2020.01); *B60Q 3/76* (2017.02); *G02F 1/1334* (2013.01); *G02F 1/137* (2013.01); *G02F 1/163* (2013.01); *G02F 1/1685* (2019.01)

(58) Field of Classification Search
  CPC ........ G02F 1/1334; G02F 1/137; G02F 1/163; B60J 3/04; B60R 1/088; B60Q 3/80; B60Q 3/60; B60Q 3/76; H05B 47/115; H05B 47/105
  See application file for complete search history.

(56) References Cited

U.S. PATENT DOCUMENTS

| | | | |
|---|---|---|---|
| 2007/0098969 A1* | 5/2007 | Ansems | B32B 17/10036 428/212 |
| 2018/0043756 A1* | 2/2018 | Kaphengst | B60J 3/04 |
| 2018/0272931 A1 | 9/2018 | Salter | |
| 2020/0019034 A1* | 1/2020 | Lagowski | B60J 3/04 |

FOREIGN PATENT DOCUMENTS

| | | |
|---|---|---|
| JP | 2018-188055 A | 11/2018 |
| JP | 2018-199391 A | 12/2018 |
| KR | 101480948 B1 | 1/2015 |

* cited by examiner

VEHICLE LIGHT-ADJUSTING SYSTEM

CROSS-REFERENCE TO RELATED APPLICATION

The present disclosure relates to a vehicle light-adjusting system. This application is a continuation of U.S. patent application Ser. No. 16/881,464, filed May 22, 2020, which claims the priority of Japanese Patent Application No. 2019-99877 filed on May 29, 2019. The contents of these applications are incorporated herein by reference in their entirety.

BACKGROUND OF THE INVENTION

A vehicle light-adjusting system using a light-adjusting member that is attached to a window to control transmission of external light is known (see Japanese Unexamined Patent Publication No. 2018-177193). The vehicle light-adjusting system includes a control-mode selecting unit that receives selection of a control mode that is a control target of a light-adjusting film, and a drive control unit that controls the transmittance of the light-adjusting film. The drive control unit adjusts the transmittance of the light-adjusting film based on the control mode selected by the control-mode selecting unit.

However, the conventional vehicle light-adjusting system has the following problems. That is, since the system is a system that only controls the transmittance of the light-adjusting film, light-adjusting can be performed only during daylight hours in the day.

Furthermore, in the system, the brightness in the vehicle interior can be reduced by shielding the external light when the vehicle interior is too bright; however, the brightness in the vehicle interior cannot be increased when the vehicle interior is too dark. Moreover, the system has a problem that fine light-adjustment cannot be performed because the system is configured to adjust the transmittance of the entire window glass.

The present disclosure has been made in view of the above circumstances, and an object of the present disclosure is to provide a vehicle light-adjusting system capable of adjusting the brightness in a vehicle interior day and night and performing fine light-adjustment. The present disclosure can be realized as the following modes.

SUMMARY OF THE INVENTION

A vehicle light-adjusting system according to the present disclosure includes:
an incident portion which an external light enters:
a light-adjusting member arranged in the incident portion:
a light emitting unit provided in an interior of a vehicle; and
a control unit that controls transmittance of the light-adjusting member and controls illuminance of the light emitting unit.

In the vehicle light-adjusting system, the light-adjusting member is divided into a plurality of parts, and the control unit is capable of adjusting an individual transmittance of each of the parts.

A vehicle light-adjusting system according to the present disclosure controls the illuminance of the light emitting units while controlling the transmittance of the light-adjusting member. Thus, the brightness in the interior of the vehicle can be adjusted day and night. Furthermore, according to the present disclosure, the light-adjusting member is divided into a plurality of parts, and the individual transmittance of each of the parts is adjusted. Thus, finer light-adjustment can be performed.

DETAILED DESCRIPTION

Figure 1:
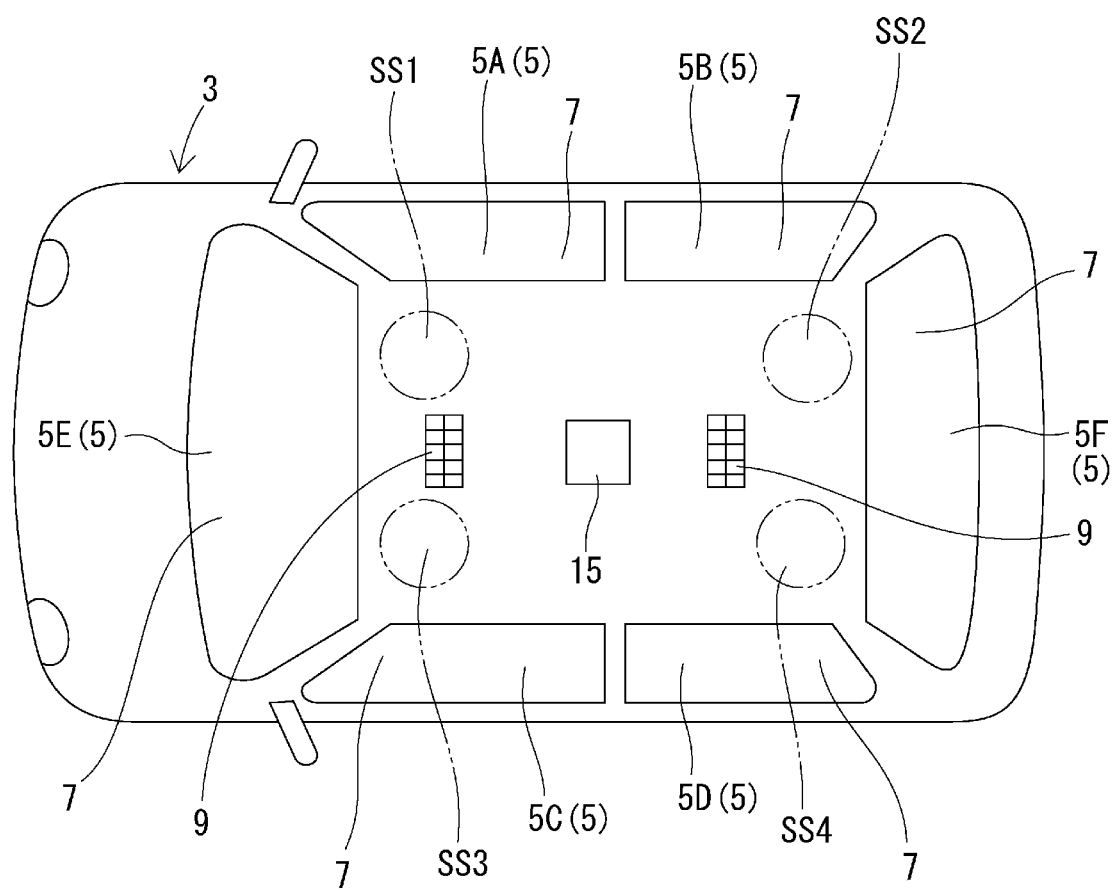
FIG. 1 is a schematic view of a vehicle 3 on which a vehicle light-adjusting system 1 is mounted, as viewed from vertically above.

Here, a desirable example of the present disclosure will be described.

The vehicle light-adjusting system further includes an information acquiring unit that acquires information on a predetermined object in the interior. In the vehicle light-adjusting system, the control unit adjusts the transmittance of the light-adjusting member and adjusts the illuminance of the light emitting unit based on the information acquired by the information acquiring unit.

According to this configuration, the brightness can be adjusted based on the information on the predetermined object, so that more appropriate light-adjustment can be performed.

In the vehicle light-adjusting system, the light emitting unit is configured such that an irradiation range of a light to irradiate is adjustable, and the control unit adjusts the irradiation range based on the information acquired by the information acquiring unit.

According to this configuration, the irradiation range can be set to an appropriate range according to the state of the predetermined object.

In the vehicle light-adjusting system, the light-adjusting member is divided into the plurality of parts by a plurality of lines arranged along a predetermined direction and a plurality of intersecting lines intersecting the plurality of lines. The control unit determines a light-shielding part that shields light among the plurality of parts, and a non-light-shielding part that does not shield light among the plurality of parts based on the information acquired by the information acquiring unit. The control unit adjusts transmittance of the light-shielding part to within a first range and adjusts transmittance of the non-light-shielding part to within a second range.

According to this configuration, fine light-adjustment can be performed, and the interior can be made hard to see from the outside to protect privacy while adjusting the amount of external light taken in.

In the vehicle light-adjusting system, the information is at least one selected from a group consisting of brightness of the predetermined object, temperature of the predetermined object, number of blinks, and diameter of a pupil of an eye.

According to this configuration, the brightness is controlled so that the brightness of the predetermined object, the temperature of the predetermined object, and the number of blinks become more desirable.

In the vehicle light-adjusting system, the predetermined object is a plurality of occupants. The information acquiring unit acquires individual information on each of the occupants. The control unit adjusts the transmittance of the light-adjusting member and adjusts the illuminance of the light emitting unit so that brightness of an individual predetermined area of the occupant becomes a predetermined illuminance.

According to this configuration, the brightness can be optimized for each occupant.

An embodiment of a vehicle 3 including a vehicle light-adjusting system 1 of the present disclosure will be described in detail with reference to the drawings.

Figure 2:
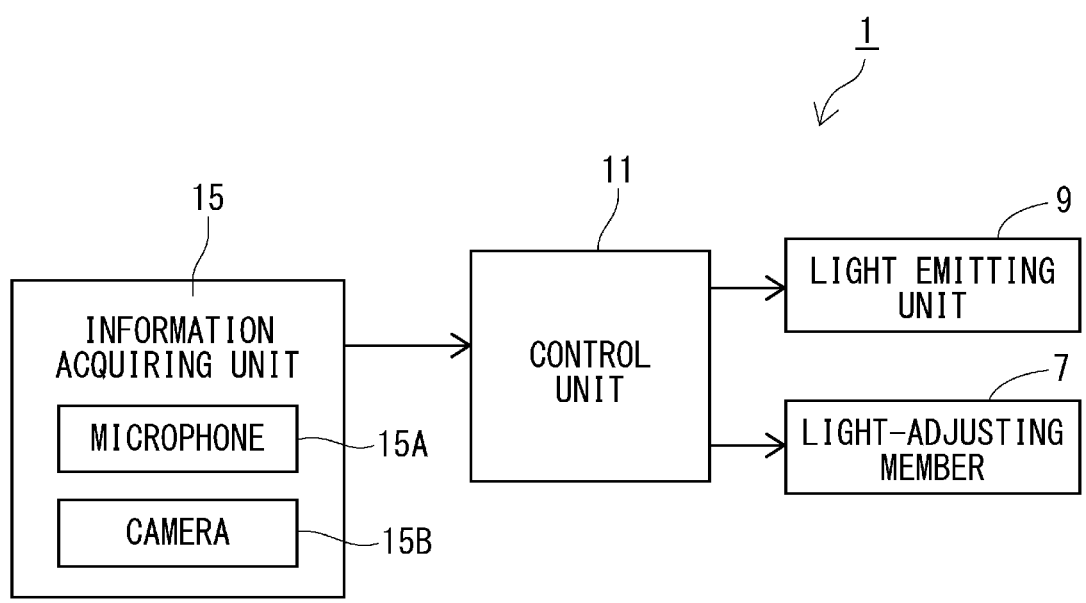
FIG. 2 is a block diagram showing the overall configuration of the vehicle light-adjusting system 1.

FIG. 1 is a schematic view of a vehicle 3 on which a vehicle light-adjusting system 1 is mounted, as viewed from vertically above. FIG. 2 is a block diagram showing an overall configuration of the vehicle light-adjusting system 1.

The vehicle light-adjusting system 1 includes an incident portion 5 which external light enters, a light-adjusting member 7 arranged in the incident portion 5, a light emitting unit 9 provided in an interior of the vehicle 3, and a control unit 11 (ECU (Electronic Control Unit)). The control unit 11 includes a CPU (Central Processing Unit), a memory (e.g., a ROM (Read Only Memory), a RAM (Random Access Memory)), and the like. The control unit 11 controls the transmittance of the light-adjusting member 7 and controls the illuminance of the light emitting unit 9. The vehicle light-adjusting system 1 includes an information acquiring unit 15 that acquires information on a predetermined object in the interior. The control unit 11 is capable of communicating information with the information acquiring unit 15 in a wired or wireless manner. The control unit 11 is capable of communicating information with the light-adjusting member 7 and the light emitting unit 9 in a wired or wireless manner.

Although illustration is omitted, the system may also include an operation input unit such as an operation key and an operation button for receiving an operation from an occupant such as a driver.

The vehicle 3 is provided with seats SS1, SS2, SS3, and SS4. The seat SS1 is a driver's seat. The occupant in the seat SS1 is a driver of the vehicle 3. The incident portion 5 which the external light enters is, specifically, a front-seat side-window 5A on the driver's seat side, a rear-seat side-window 5B on the driver's seat side, a front-seat side-window 5C on a passenger's seat side, a rear-seat side-window 5D on the passenger's seat side, a front window 5E, and a rear window 5F. A roof window (not shown) may be further provided as the incident portion 5.

The light-adjusting member 7 is arranged on substantially the entire surface of the front-seat side-window 5A, the rear-seat side-window 5B, the front-seat side-window 5C, the rear-seat side-window 5D, the front window 5E, and the rear window 5F.

More specifically, the light-adjusting member 7 is attached from the vehicle interior side to a glass plate, which is an example of a transparent plate material constituting the front-seat side-window 5A, the rear-seat side-window 5B, the front-seat side-window 5C, the rear-seat side-window 5D, the front window 5E, and the rear window 5F. The light-adjusting member 7 may be attached from the vehicle exterior side, or may be sandwiched between glass plates of laminated glass of each window by way of an intermediate film.

Each of the light-adjusting members 7 arranged in the front-seat side-window 5A, the rear-seat side-window 5B, the front-seat side-window 5C, the rear-seat side-window 5D, the front window 5E, and the rear window 5F is divided into a plurality of parts 41. Here, the light-adjusting member 7A of the front-seat side-window 5A will be specifically described. The same applies to the structures of the other windows, the rear-seat side-window 5B, the front-seat side-window 5C, the rear-seat side-window 5D, front window 5E, and the rear window 5F.

Figure 3:
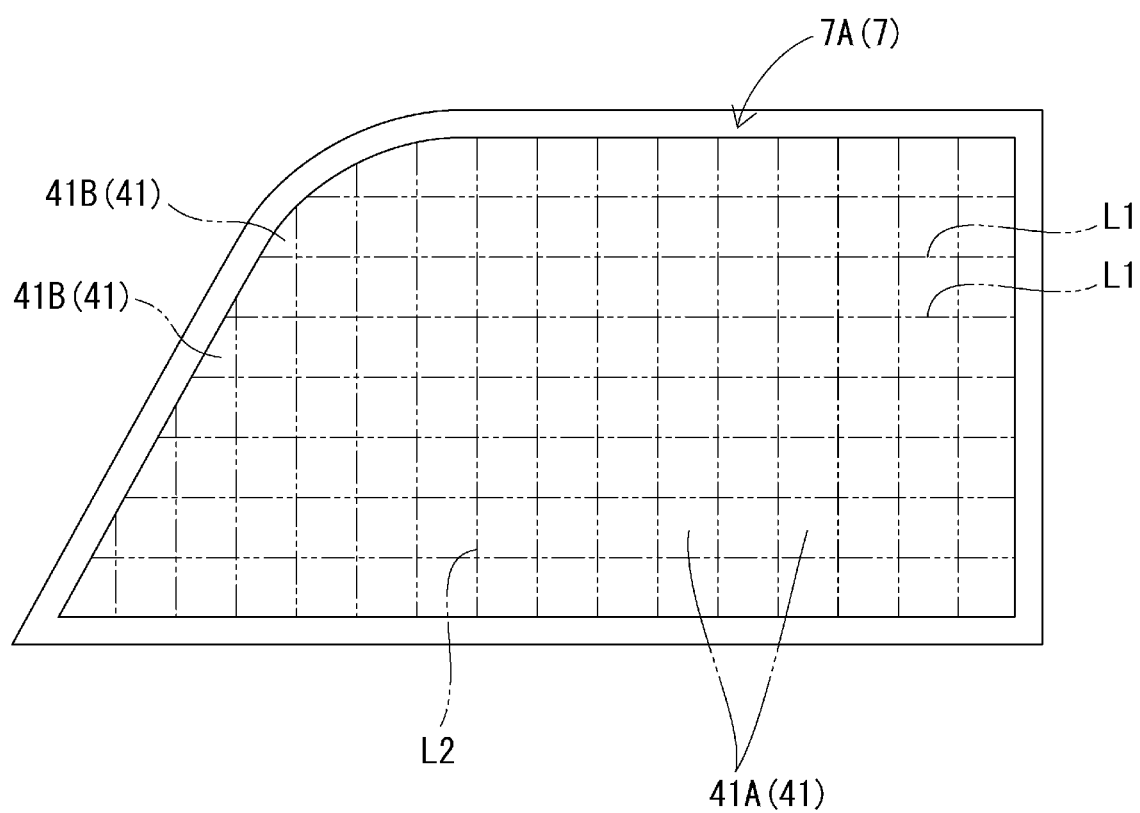
FIG. 3 is an explanatory view showing a light-adjusting member 7A of a front-seat side-window 5A.

FIG. 3 schematically shows the light-adjusting member 7A of the front-seat side-window 5A. The light-adjusting member 7A is divided into a plurality of parts 41 by a plurality of lines L1 arranged in a horizontal direction and a plurality of intersecting lines L2 intersecting the plurality of lines L1. Inside an outer edge portion of the light-adjusting member 7A, the parts 41 are rectangular parts 41A having the same area. In the outer edge portion of the light-adjusting member 7A, not only rectangular but also triangular or trapezoidal parts 41B are present.

The control unit 11 can adjust the individual transmittance of each part 41.

Figure 4:
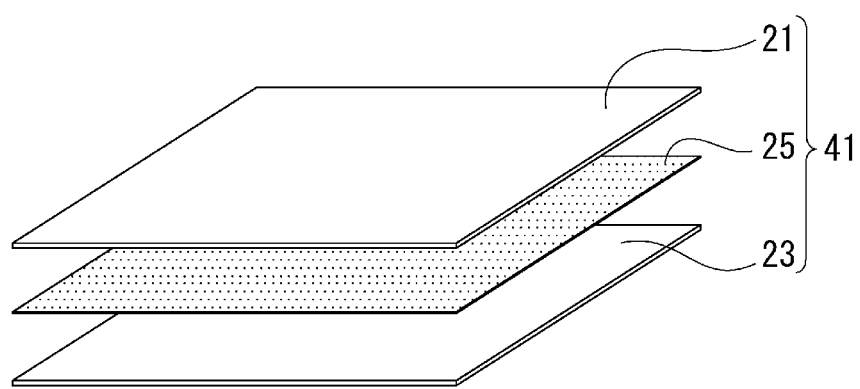
FIG. 4 is an exploded perspective view showing a part 41 of the light-adjusting member 7.
Figure 5:
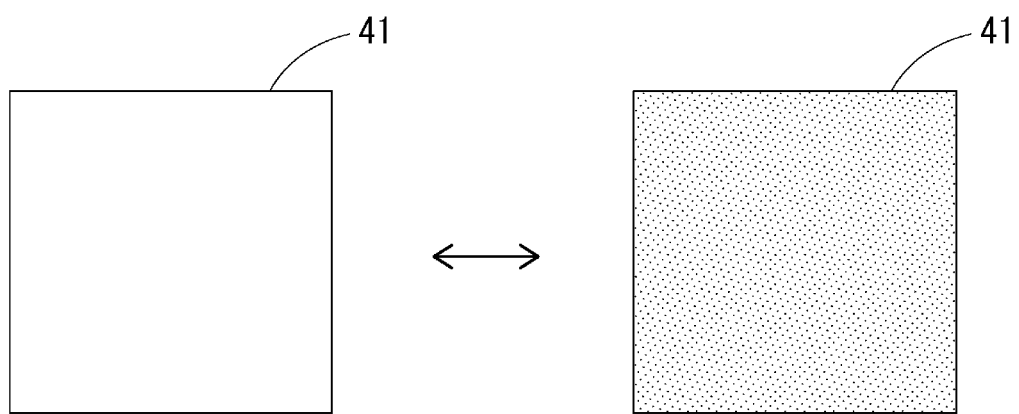
FIG. 5 is an explanatory view showing change in transmittance of the part 41 of the light-adjusting member 7.

As shown in FIG. 4, in each part 41 of the light-adjusting member 7, a light-adjusting film 25 is disposed between a first electrode 21 and a second electrode 23, and the transmittance is changed by a voltage applied in between the first electrode 21 and the second electrode 23. For example, each part 41 becomes transparent or high transmittance when voltage is applied as shown in the left figure of FIG. 5, and becomes opaque or low transmittance when no voltage is applied as shown in the right figure of FIG. 5.

As the light-adjusting film 25, there is suitably exemplified (1) a light-adjusting film 25 using an EC (Electro Chromic) method, (2) a light-adjusting film 25 using an SPD (Suspended Particle Device) method, (3) a light-adjusting film 25 using liquid crystals of VA (Vertical Alignment) method, TN (Twisted Nematic) method or IPS (In-Place-Switching) method.

The light-adjusting film 25 using the EC method has a structure in which a light-adjusting layer (electrolyte layer) is sandwiched between a pair of electrodes. The color of the light-adjusting layer changes between transparent and dark blue according to the potential difference between the electrodes using the oxidation-reduction reaction.

The light-adjusting film 25 using the SPD method is usually colored dark blue using the orientation of fine particles, but changes to transparent when voltage is applied, and returns to the original dark blue when the voltage is turned off. Thus, light and shade can be adjusted by the voltage.

Further, the light-adjusting film 25 using a PDLC (Polymer Dispersed Liquid Crystal) method may be used. The light-adjusting film 25 using the PDLC method has a network structure made of a special polymer formed in the liquid crystal layer, wherein a state in which an array of liquid crystal molecules is irregular is induced by the action of the polymer network, so that light is scattered. When a voltage is applied to array the liquid crystal molecules in the direction of the electric field, light is not scattered so that a transparent state is obtained.

The information acquiring unit 15 is constituted of a sensor group including various sensors that acquire information on a predetermined object. Examples of the predetermined object include an occupant and various members in the interior. Although the information is not particularly limited, the brightness of the predetermined object, the temperature of the predetermined object, the number of blinks, and the diameter of the pupil of the eye are preferably exemplified.

The sensor group includes a microphone 15A for recognizing voice, a camera 15B for acquiring image information of the interior, and the like. The microphone 15A has a function of identifying and acquiring an individual voice of each occupant. The camera 15B is configured to be capable of sensing the state of the object.

The control unit 11 determines a light-shielding part that shields light and a non-light-shielding part that does not shield light among the plurality of parts 41 based on the information acquired by the camera 15B, and adjusts the transmittance of the light-shielding part to within the first range and adjusts the transmittance of the non-light-shielding part to within the second range. For example, the transmittance of visible light (e.g., wavelength of 380 nm to 750 nm) of the light-shielding part is adjusted to be within the first range (e.g., 0 to 30%), and the transmittance of visible light of the non-light-shielding part is adjusted to be within the second range (e.g., 70 to 100%). The first range, which is the transmittance of the visible light of the light-shielding part, is smaller than the second range, which is the transmittance of the visible light of the non-light-shielding part (first range<second range).

Figure 6:
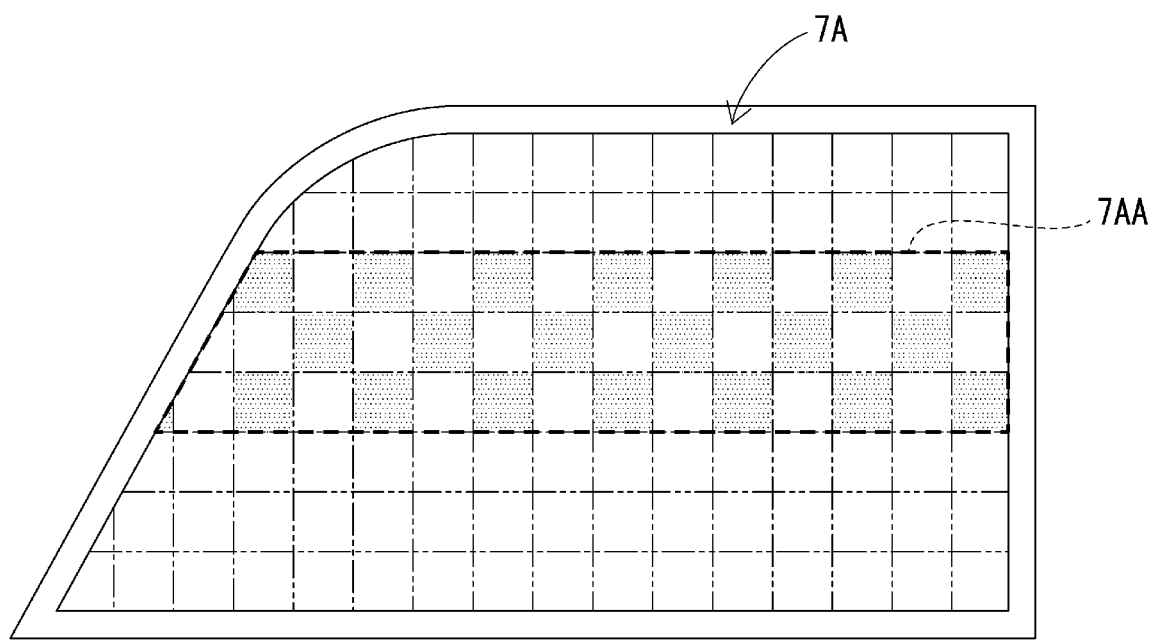
FIG. 6 is an explanatory view showing an example of a light-adjusting pattern of a light-adjusting member 7A.

Specifically, a pattern of the light-shielding part and the non-light-shielding part as illustrated in FIG. 6 is exemplified. In FIG. 6, black parts indicate light-shielding parts, and white portions indicate non-light-shielding parts. In the light-adjusting member 7A, an area 7AA (enclosed by a broken line) where the light-shielding part exists is a portion where light-adjustment is required, and need not to be the entire surface of the light-adjusting member 7A. This area 7AA is, for example, set in a belt-like shape at the respective middle parts in the vertical direction of the side-windows (front-seat side-window 5A, rear-seat side-window 5B, front-seat side-window 5C, and rear-seat side-window 5D). The area 7AA is, for example, the height position of the occupant's face. When the area 7AA where light is adjusted is thus set, external light that hits the occupant's face is reduced so that the glare is eliminated, while the upper and lower portions of the area 7AA are unshielded so that sufficient external light can be taken in to maintain the brightness of the interior.

The light-adjusting pattern of the light-shielding part and the non-light-shielding part in the area 7AA where the light-shielding part exists is determined from the viewpoint of the amount of external light taken in and privacy protection. The amount of external light taken in can be controlled by adjusting the ratio of the total area of the light-shielding parts and the total area of the non-light-shielding parts. Furthermore, for example, as shown in FIG. 6, the interior of the vehicle 3 can be made hard to see from outside the vehicle 3 to protect privacy by arranging adjacent parts 41 such that the light-shielding parts and the non-light-shielding parts are alternately arranged in both the vertical direction and the lateral direction. A suitable example of the light-adjusting pattern is a lattice pattern (checkered pattern).

A plurality of light-adjusting patterns of the light-shielding part and the non-light-shielding part may be stored in a memory being associated with information such as the brightness of the predetermined object, the temperature of the predetermined object, the number of blinks, and the diameter of the pupil of the eye. In this case, the control unit 11 determines a light-adjusting pattern corresponding to the information based on the information obtained by the camera 15B, and adjusts the voltage of each part 41 so that the light-shielding part and the non-light-shielding part form such light-adjusting pattern.

The control unit 11 also adjusts the illuminance and the irradiation range 27 of the light emitting unit 9 based on the information acquired by the camera 15B.

The light emitting unit 9 is a light emitting unit that includes a light source capable of adjusting the light color, illuminance, color temperature, contrast, and irradiation range 27 of the emission light, and is used for illumination and the like of a vehicle interior. The number of light emitting units 9 is not particularly limited, and may be one or two or more.

The light emitting unit 9 can emit light of the following light colors, in addition to visible light (e.g., wavelength of 380 nm to 750 nm). Examples of the light colors are, a light color (purple) belonging to a wavelength of 380 nm to 450 nm, a light color (blue) belonging to a wavelength of 450 nm to 495 nm, a light color (green) belonging to a wavelength of 490 nm to 570 nm, a light color (yellow) belonging to a wavelength of 570 nm to 590 nm, a light color (orange) belonging to a wavelength of 590 nm to 620 nm, and a light color (red) belonging to a wavelength of 620 nm to 750 nm.

The illuminance of emission light adjusted by the light emitting unit 9 is a physical quantity representing the brightness of light illuminating the surface of a physical body, and is expressed in lux. For example, the adjustment is performed stepwise by each physical quantity in a range from relatively bright high illuminance (high lux) to dark low illuminance (low lux).

The color temperature of emission light adjusted in the light emitting unit 9 is a scale representing the color of light emitted from the light source by a quantitative numerical value, and is expressed in thermodynamic temperature K (Kelvin). It is adjusted in some types, for example, from a relatively warm bulb color to warm white, white, day white, daylight color, and the like.

The contrast adjusted in the light emitting unit 9 is a contrast ratio in illumination, and is adjusted stepwise by each numerical value, for example, from a high contrast in which light and dark is relatively clear to a low contrast in which light and dark is not clear.

The light emitting unit 9 is divided into a plurality of light emitting areas 9A, 9B, 9C, 9D, 9E, 9F, 9G, 9H, 9I, 9J, in each of which light color, illuminance, color temperature, and contrast of emission light are adjustable independently.

Figure 7:
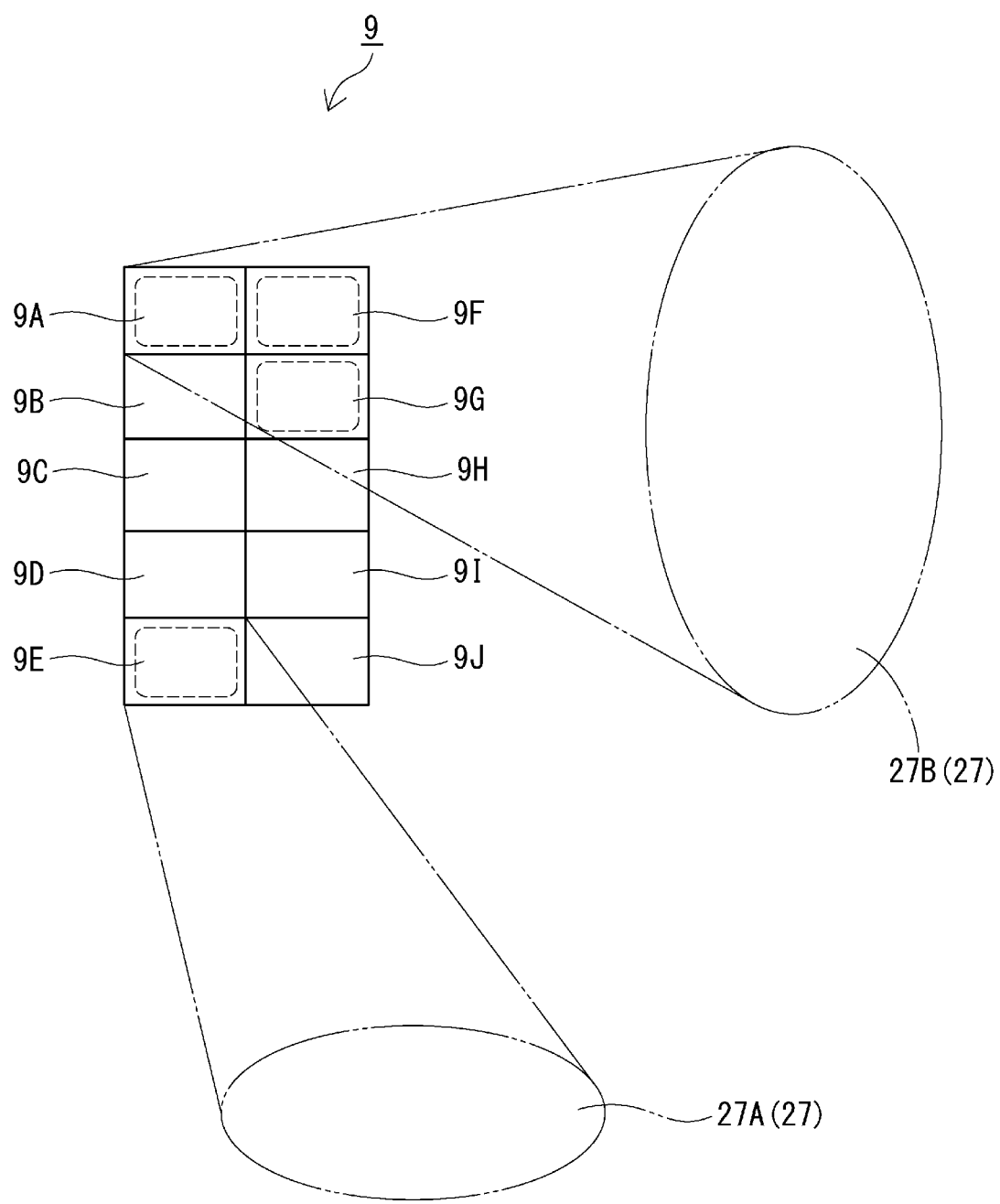
FIG. 7 is a conceptual view showing an irradiation range 27.

The irradiation range 27 (irradiation area) adjusted in the light emitting unit 9 refers to a range irradiated with light by the light emitting unit 9, as shown in FIG. 7. The irradiation range 27 is adjusted stepwise from a narrow-area irradiation range 27A such as a spotlight to a wide-area irradiation range 27B in which light spreads over a wide range. For example, the irradiation range 27A is adopted when irradiating only a peripheral part of a book at the time of reading. The irradiation range 27B is adopted at the time of eating.

In the case of FIG. 7, the irradiation range 27 is defined in advance for each of the light emitting areas 9A, 9B, 9C, 9D, 9E, 9F, 9G, 9H, 9I, and 9J. In this example, when the light emitting area 9E emits light, the irradiation range 27A is illuminated. When the light emitting areas 9A, 9F, and 9G emit light, the irradiation range 27B is illuminated.

As the light emitting unit 9, for example, an LED or the like can be used in which the light color, the illuminance, the color temperature, the contrast, and the irradiation range 27 can be adjusted within a certain range. Furthermore, the light emitting unit 9 may be configured to include a plurality of light sources having different light emitting colors and driving means therefor. As a specific example, each light source can be an LED element whose light emitting color is red, green, or blue. When the light emitting unit 9 includes a plurality of light sources having different light emitting colors, the light colors can be changed by the mixing ratio of the light sources.

In the light emitting unit 9, the driving means of the light source can be configured to drive each light source based on a light emission control signal that is sent from the control unit 11 to give the instruction of light color, illuminance, color temperature, and contrast of the emission light for the light source. The driving method is not particularly limited, and for example, a PWM (pulse width modulation) method can be adopted. When a PWM signal is used, the driving power of each light source can be controlled by its frequency and duty ratio. The driving means may have a function of correcting the supply power to each light source so as to obtain a desired light color, illuminance, color temperature, contrast, and irradiation range 27 depending on the type, structure, characteristics, and the like of the light source to use.

Figure 8:
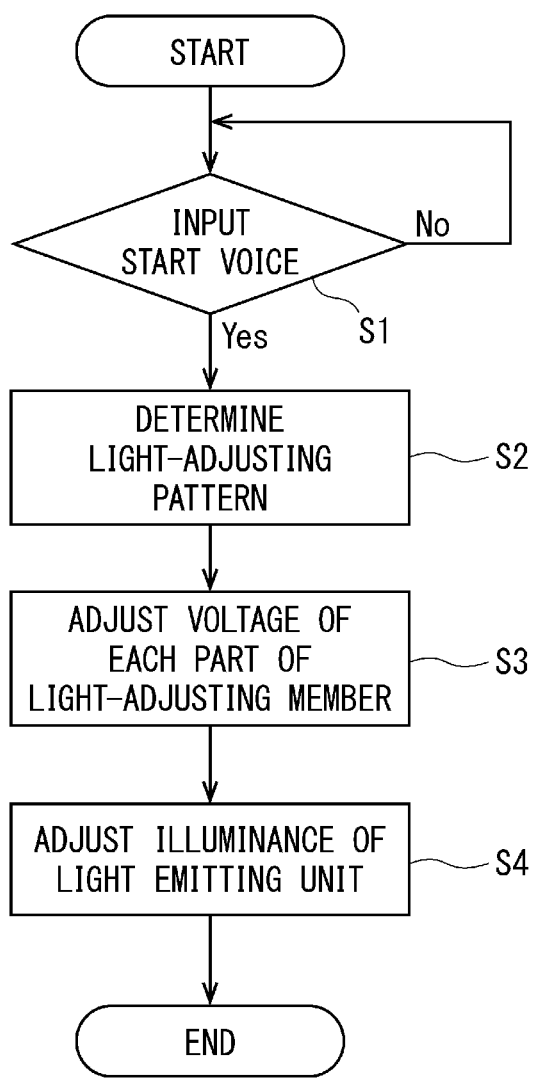
FIG. 8 is a flowchart illustrating an example of a processing procedure of the vehicle light-adjusting system 1.

FIG. 8 is a flowchart illustrating an example of a processing procedure of the vehicle light-adjusting system 1. This operation program is stored in the ROM in the control unit 11, and is executed by the CPU.

When it is determined that the voice input from the microphone 15A is an instruction to start the vehicle light-adjusting system 1 (step S1: YES), the vehicle light-adjusting system 1 is started.

On the basis of the information acquired by the camera 15B, the control unit 11 determines a light-adjusting pattern of the light-adjusting member 7 corresponding to the information (step S2). Next, the voltage of each part 41 of the light-adjusting member 7 is adjusted so as to have such a light-adjusting pattern (step S3). Then, the control unit 11 adjusts the illuminance of the light emitting unit 9 based on the information obtained by the camera 15B.

The "information acquired by the camera 15B" is, for example, information such as the temperature of the occupant's face, the brightness of the occupant's face, the number of blinks of the occupant's eyes, and the diameter of the pupil of the occupant's eyes.

When a plurality of occupants are on board, the camera 15B may acquire the individual information of each of the occupants, and the control unit 11 may adjust the transmittance of the light-adjusting member 7 and adjust the illuminance of the light emitting unit 9 so that the brightness of the individual predetermined area of the occupant becomes a predetermined illuminance. Such adjustment can be realized by, for example, determining a light-adjusting pattern of the light-shielding part and the non-light-shielding part for each of the front-seat side-window 5A, the rear-seat side-window 5B, the front-seat side-window 5C, the rear-seat side-window 5D, the front window 5E, and the rear window 5F and individually adjusting each window, installing a plurality of light emitting units 9, and individually adjusting the illuminance of each light emitting unit 9. Here, the individual predetermined area of the occupant is, for example, a face, hands, feet, and the like.

As described above, the vehicle light-adjusting system 1 controls the illuminance of the light emitting unit 9 while controlling the transmittance of the light-adjusting member 7, and thus can adjust the brightness in the interior of the vehicle 3 day and night.

Furthermore, according to the vehicle light-adjusting system 1, the light-adjusting member 7 is divided into a plurality of parts 41 and the individual transmittance of each part 41 is adjusted, so that finer light-adjustment can be performed, and appropriate light-adjustment can be performed for each occupant. Moreover, according to such a configuration, the interior can be made hard to see from the outside to protect privacy while adjusting the amount of external light taken in.

The vehicle light-adjusting system 1 can also perform a more appropriate light-adjustment since the brightness is adjusted based on the information of the occupant. For example, when the occupant tries to perform a desired action such as eating, reading, and the like, but the visibility is poor and it is difficult for the occupant to perform the action because the interior is too dark, the illuminance of the light emitting unit 9 can be increased so that the occupant can perform the action comfortably. Furthermore, in a state in which the interior is too bright and the number of blinks of the occupant is large, or in a state in which the external light is too strong and the temperature of the occupant is high, the transmittance of the light-adjusting member 7 can be reduced from the current state so that the occupant can spend a comfortable time. Moreover, since the control unit 11 adjusts the irradiation range 27 based on the information of the occupant, the irradiation range 27 can be set to an appropriate range according to the state of the occupant.

Furthermore, the light-adjusting member 7 is divided into a plurality of parts 41 by a plurality of lines L1 arranged along the horizontal direction and a plurality of intersecting lines L2 intersecting the plurality of lines L1. In this configuration, various patterns of the light-shielding part and the non-light-shielding part can be easily created, and thus the interior may be made hard to see from the outside to protect privacy while adjusting the amount of external light taken in by fine light-adjustment.

When the information is at least one selected from the group consisting of the brightness of the predetermined object, the temperature of the predetermined object, the number of blinks, and the diameter of the pupil of the eye, the brightness can be controlled so that these parameters become more desirable, and thus the occupant can spend a more comfortable time.

When a plurality of occupants are on board, the camera 15B acquires the individual information of each of the occupants, and the control unit 11 adjusts the transmittance of the light-adjusting member 7 and adjusts the illuminance of the light emitting unit 9 so that the brightness of the individual predetermined area of the occupant becomes a predetermined illuminance. Therefore, the brightness can be optimized for each occupant.

The foregoing examples are merely for illustrative purposes and are not to be construed as limiting the present disclosure. Although the present disclosure has been described with reference to exemplary embodiments, it is to be understood that the language used in the description and the illustration of the present disclosure is descriptive and illustrative and not restrictive. As set forth herein, modifications may be made within the scope of the appended Claims without deviating from the scope or essence of the present disclosure in its form. Although reference has been made herein to specific structures, materials and examples in the detailed description of the present disclosure, it is not intended to limit the present disclosure to the disclosed matters herein, but rather the present disclosure is to cover all functionally equivalent structures, methods, and uses within the scope of the appended Claims.

The present disclosure is not limited to the embodiments described in detail above, and various modifications or changes can be made within the scope defined in the Claims of the present disclosure.

(1) In the embodiment described above, a car (automobile) is exemplified as the vehicle 3, but the vehicle light-adjusting system 1 may be applied to other vehicles, such as a train or a game vehicle serving as a ground vehicle, an airplane or a helicopter serving as a flying vehicle, a ship or a submarine serving as a marine or an underwater vehicle.

(2) In the embodiment described above, the example in which the information acquiring unit 15 constituted of the sensor group is arranged on the ceiling surface of the vehicle 3 has been described, but the installing location of the information acquiring unit 15 is not particularly limited. Furthermore, sensors may be respectively arranged at different locations.

(3) In the embodiment described above, the example in which the light emitting unit 9 is arranged on the ceiling surface of the vehicle 3 has been described, but the installing location of the light emitting unit 9 is not particularly limited.

(4) In the embodiment described above, the example in which the number of the light emitting units 9 is two has been described, but the number of the light emitting units 9 can be appropriately changed.

(5) In the embodiment described above, the example in which the predetermined object is an occupant has been described, but the predetermined object can be appropriately changed. For example, the predetermined object may be an interior component such as a seat or a floor.

(6) In the embodiment described above, the vehicle light-adjusting system 1 is started by the voice input from the microphone 15A, but the method of starting the vehicle light-adjusting system 1 is not particularly limited. For example, the vehicle light-adjusting system 1 may be started by an occupant operating an operation unit such as a switch.

(7) In the embodiment described above, the example in which the light-adjusting member 7 is divided into the plurality of parts 41 by the plurality of lines L1 and the plurality of intersecting lines L2 has been described, but the dividing manner is not particularly limited. Furthermore, the area of each part 41 can be arbitrarily changed.

(8) In the embodiment described above, the light emitting unit 9 is divided into eight light emitting areas 9A, 9B, 9C, 9D, 9E, 9F, 9G. 9H, 9I, and 9J, but the number of divisions is not limited. Furthermore, the light emitting unit 9 may not be divided into a plurality of light emitting areas.

(9) In the embodiment described above, the example in which the light emitting unit 9 is divided into a plurality of light emitting areas 9A, 9B, 9C, 9D, 9E, 9F, 9G, 9H, 9I, 9J, and the irradiation range 27 is defined in advance for each light emitting area 9A, 9B, 9C, 9D, 9E, 9F, 9G, 9H, 9I, 9J has been described, but the irradiation range 27 may be controlled by a direction change of the light emitting unit 9 by an actuator (e.g., a servomotor, a solenoid, or the like).

What is claimed is:

1. A vehicle light-adjusting system comprising:
an incident portion which an external light enters;
a light-adjusting member arranged in the incident portion;
a light emitting unit provided in an interior of a vehicle; and
a control unit that controls transmittance of the light-adjusting member and controls illuminance of the light emitting unit, wherein
the light-adjusting member is divided into a plurality of parts, and
the control unit is capable of adjusting an individual transmittance of each of the plurality of parts,
wherein the light emitting unit is arranged remotely from the light-adjusting member,
the vehicle light-adjusting system further comprising an information acquiring unit that acquires information on a predetermined object in the interior,
wherein the control unit, based on the information acquired by the information acquiring unit:
adjusts the transmittance of the light-adjusting member to reduce an amount of external light entering the interior of the vehicle while adjusting the illuminance of the light emitting unit to increase an amount of emission light in the interior of the vehicle to compensate for the reduced amount of external light entering the interior of the vehicle, or
adjusts the transmittance of the light-adjusting member to increase the amount of external light entering the interior of the vehicle while adjusting the illuminance of the light emitting unit to reduce the amount of emission light in the interior of the vehicle to compensate for the increased amount of external light entering the interior of the vehicle,
wherein
the light-adjusting member is divided into the plurality of parts by a plurality of lines arranged along a predetermined direction and a plurality of intersecting lines intersecting the plurality of lines,
the control unit determines a light-shielding part that shields light among the plurality of parts, and a non-light-shielding part that does not shield light among the plurality of parts based on the information acquired by the information acquiring unit, adjusts the transmittance of the light-shielding part to within a first range, and adjusts the transmittance of the non-light-shielding part to within a second range, and
the light-adjusting member is operable to provide adjacent parts as alternately-arranged light-shielding parts and non-light-shielding parts to protect privacy of an occupant.

2. The vehicle light-adjusting system according to claim 1, wherein
the light emitting unit is configured such that an irradiation range of a light to irradiate is adjustable, and
the control unit adjusts the irradiation range based on the information acquired by the information acquiring unit.

3. The vehicle light-adjusting system according to claim 1, wherein the information is at least one selected from a group consisting of brightness of the predetermined object, temperature of the predetermined object, number of blinks, and diameter of a pupil of an eye.

4. The vehicle light-adjusting system according to claim 1, wherein
the predetermined object is a plurality of occupants,
the information acquiring unit acquires individual information on each of the plurality of occupants, and
the control unit adjusts the transmittance of the light-adjusting member and adjusts the illuminance of the light emitting unit so that brightness of an individual predetermined area of an occupant of the plurality of occupants becomes a predetermined illuminance.

5. The vehicle light-adjusting system according to claim 1, wherein the light emitting unit is arranged in a ceiling of the vehicle.

6. The vehicle light-adjusting system according to claim 1, wherein the light emitting unit is arranged in regions of the interior of the vehicle not having the incident portion.

7. The vehicle light-adjusting system according to claim 4, wherein the control unit adjusts the transmittance of the light-adjusting member and adjusts the illuminance of the light emitting unit so that brightness of the individual predetermined area of each occupant of the plurality of occupants becomes a respective predetermined illuminance.

8. The vehicle light-adjusting system according to claim 1, wherein the light emitting unit is operable to emit light in a different direction than light transmitted through the incident portion.

9. The vehicle light-adjusting system according to claim 1, wherein the control unit adjusts the transmittance of the light-adjusting member to form a belt shape in a middle part in the vertical direction of the incident portion.

10. The vehicle light-adjusting system according to claim 9, wherein the belt shape is formed in a side window.

11. The vehicle light-adjusting system according to claim 9, wherein the belt shape is at a height position of an occupant's face.

12. The vehicle light-adjusting system according to claim 1, wherein the control unit of the vehicle light-adjusting system commences control upon voice input.

13. The vehicle light-adjusting system according to claim 1, wherein the control unit of the vehicle light-adjusting system commences control upon manual operation of a switch.

14. The vehicle light-adjusting system according to claim 1, wherein the control unit is operable to contemporaneously adjust the transmittance of the light-adjusting member and the illuminance of the light emitting unit to dynamically maintain a constant brightness in the interior.

* * * * *